Patented Aug. 6, 1940

2,209,965

UNITED STATES PATENT OFFICE 2,209,965

TRANSPARENT MOISTUREPROOF PELLICLE AND METHOD FOR MAKING SAME

Theron G. Finzel, Kenmore, N. Y., assignor, by mesne assignments, to E. I. du Pont de Nemours & Company, Wilmington, Del., a corporation of Delaware No Drawing. Application October 23, 1934, Serial No. 749,616

8 Claims. (Cl. 91—68)

This invention relates to a moistureproof, transparent sheet or film. More particularly, it relates to a moistureproof, non-fibrous, transparent sheet or film, suitable for use as a wrapping tissue, and containing a thermoplastic, resin-like rubber derivative and to the method of making the same.

Moistureproof, non-fibrous, transparent sheets or films have been produced heretofore by applying a suitable moistureproofing composition, for example, a composition including a cellulose derivative and a wax, and preferably also containing a resin and a plasticizer, on a supporting base film of non-fibrous, transparent, cellulosic material, such as, for example, regenerated cellulose.

It has now been found that a very desirable moistureproof, non-fibrous, transparent sheet or film possessing good slip, transparency and flexibility can be produced by applying a coating composition comprising a thermoplastic, resin-like substance, (the product derived from rubber or a rubber solution and a halide salt or a halogenated acid of a metal having a plurality of residual or so-called "secondary" valences) combined with a suitable plasticizer and a wax and dissolved in a suitable volatile solvent, on a sheet or film of non-fibrous, transparent, cellulosic material, and subjecting the coated material to a temperature at least equal to the melting point of the wax in the composition. A sheet or film of similarly desirable characteristics can be obtained by casting a self-sustaining sheet from a composition as set forth above.

It is, therefore, an object of this invention to produce a moistureproof, transparent, non-fibrous sheet or film suitable for use as a wrapping tissue.

It is another object of this invention to provide a method for producing a moistureproof, transparent, non-fibrous sheet or film possessing desirable slip, flexibility, transparency and heat-sealing properties.

It is a further object of this invention to produce a moistureproof, transparent, non-fibrous sheet or film containing a thermoplastic, resin-like substance derived from rubber or a rubber solution and a halide salt or halogenated acid of a metal having a plurality of residual or secondary valences.

It is a still further object of this invention to provide a moistureproofing composition for coating a cellulosic sheet or film containing a thermoplastic resin-like substance derived from rubber or a rubber solution and a halide salt or halogenated acid of a metal having a plurality of residual or secondary valences.

Other objects of the invention will become evident from the following detailed description.

According to one embodiment of this invention, a suitable cellulosic base sheet or film is coated with a composition comprising a thermoplastic, resin-like substance obtained by reacting rubber or a rubber solution with a halide salt or halogenated acid of a metal having a plurality of secondary valences, a moistureproofing wax, and preferably also a plasticizing agent dissolved in a volatile solvent. The coated sheet or film is subjected to a temperature equal to the melting or crystallization point of the wax in the composition, either preferably simultaneously with, or, alternatively, subsequent to the drying of the coating after the removal of the excess coating composition therefrom. When the base sheet or film is composed of a material which will lose a substantial amount of the moisture content thereof in the process of coating the same, the completed sheet or film may be submitted to a humidifying treatment, preferably carried out at an elevated temperature sufficiently high so that the coating will temporarily lose a portion of its impermeability to permit moisture from surrounding atmosphere to diffuse therethrough into the inner base which is thus softened.

The coating composition may be applied to the base sheet or film in any desired manner, such as, for example, by immersing the base sheet in a bath containing the coating composition, by spraying the coating composition thereon, or the like. After the application of the coating composition to the base, the excess thereof may be removed by scraping or wiping the same therefrom by means of a doctor knife or other suitable apparatus.

The coated sheet is then preferably placed into a drying chamber, which chamber is maintained at a temperature above the melting point of the wax in the composition, at which temperature removal of the solvent of the coating composition therefrom is effected.

The preferred form of the invention contemplates using base sheets, such as those which may be precipitated from aqueous cellulosic dispersions and including alkali-soluble cellulose ethers such as lowly substituted methyl or ethyl cellulose, cellulose hydroxy ethers such as glycol cellulose, cellulose carboxy ethers such as lowly substituted cellulose glycollic acid, or regenerated cellulose. However, other cellulosic materials such as treated paper, cellulose derivatives such as cellulose acetate, or benzyl cellulose, materials coated with non-moistureproofing compositions, sheets or films of albuminous material such as gelatin, agar-agar, etc. are also contemplated.

The moistureproofing composition contemplated by this invention consists generally of a thermoplastic, resin-like, rubber derivative and a wax, and preferably also a plasticizing agent, in a suitable volatile solvent.

As the thermoplastic, resin-like, rubber derivative is contemplated a product obtained by reacting rubber or a rubber solution with a halide salt or halogenated acid of a metal having a plurality of secondary valences, such as, tin tetrachloride or tetrabromide, antimony pentachloride, titanium tetrachloride, boron trichloride, ferric chloride, antimony trichloride, boron trifluoride, fluoboric acid, chlorostannic or chlorostannous acid and the like, as described by Thies and Clifford in the Journal of Industrial and Engineering Chemistry, volume 26, page 123 (1934). The rubber derivative obtained in the above mentioned manner through the use of tin compounds has been found to be particularly desirable. These products are commonly known as and will be hereinafter referred to as thermoplastic rubber derivatives of the Plioform type. For the purposes of this invention, boron is considered as a metal and is included as such in the above definition.

As the preferred moistureproofing constituent of the moistureproofing composition is contemplated a high melting paraffin wax, such as one melting at over 50° C. and preferably one having a melting point at about 60° C. Such high melting point waxes are effective in producing a high degree of moistureproofness and produce a film having an improved slip and freedom from smearing. Alternatively, another wax or wax-like substance capable of moistureproofing may be used such as, for example, spermaceti wax, ceresin, montan, palm wax, Japan wax, Chinese insect wax, tallow, beeswax or synthetic waxes may be used. Obviously, any of these waxes or wax-like substances may be used singly or combined, as desired.

For certain purposes, the flexibility of the moisture-proof sheet or film can be enhanced by the addition of a plasticizer, among which may be mentioned butyl stearate, dibutyl phthalate, the stearate of the mono-ethyl ether of ethylene glycol, dicyclohexyl phthalate, ethyl, methyl or benzyl abietate, dixylyl ethane and other generally known pyroxylin plasticizers.

Certain resins may be added to the Plioform type rubber derivative-plasticizer-wax solution for the purpose of producing better surface flow and eliminating such effects as orange peel when the solvents are not evaporated under the most favorable conditions. Among resins which are suitable for these purposes, the following may be named: cumar-indene resins, rosin, hydrogenated rosin, ester gum, hydrogenated ester gum, balata resin, dammar, gum thus, chlorinated diphenyl, or Amberol.

As a solvent for the moistureproofing compositions is contemplated any solvent which will dissolve completely all the ingredients and keep those ingredients dissolved until the last trace of solvent has evaporated. However, we prefer to use hydrocarbons or chlorinated hydrocarbon solvents in accordance with this invention. Among the solvents contemplated are benzol, toluene, xylol, naphtha, gasoline, ethylene dichloride, tetrachlorethane, chloriform, etc. The solvent or solvent mixture should be chosen so that the boiling point of the solvent or solvent mixture is not below the crystallizing temperature of the wax in the solution at any time during the solvent evaporation.

The compositions may, of course, be modified in many ways without departing from the spirit of the invention. Various desirable effects may be secured by the use of powdered mica, pigments, fish scales, metallic salts and the like. Oil-soluble dyes may be added where a transparent colored coating is desired.

The relative proportion of the solid ingredients constituting the solution or coating may vary within comparatively wide limits, depending upon the specific materials used and/or the properties desired in the final product.

The proportion of wax may vary between 1% and 95%, based on the solids of the coating composition. If no plasticizer is used, more wax can be tolerated. The proportion of thermoplastic rubber derivative of the Plioform type may vary from 5% to 90% to yield suitable coating compositions.

Paraffin wax is well known to have a very strong tendency to crystallize. Consequently, it was considered impossible to obtain the advantages of a high paraffin wax content without producing a translucent, or at least a hazy or blushed film. Contrary to expectations, it has been found that a rubber derivative of the Plioform type exhibits an unexpected and surprising action on paraffin and similar waxes, namely, that it inhibits the crystallization thereof to such a degree that coatings of the usual total thickness of 0.00005" to 0.00014", as used in the application of wax-containing pyroxylin coatings, and having a wax content of 10 to 90%, remain clear, flexible and moistureproof. Due to the permissible higher wax content, the coated films have a very desirable slip and freedom from tackiness.

The proportion of resins, when used, may also vary within wide limits, depending upon the type of resins used and the type of coating desired, to yield satisfactory results. The proportion of resins contemplated by this invention may vary from 0 to 35%. Soft resins, such as cumar-indene resins, may displace the plasticizer, and consequently may be added in larger proportions than harder resins such as rosin or Amberol. The proportion of plasticizing agent may vary between 1 and 20%, depending largely upon the various proportions of the remaining constituents of the coating compositions.

It has furthermore been found that when a solution containing a rubber derivative of the Plioform type, a plasticizer, and wax is cast on a polished plate, wheel or belt and the solvent allowed to evaporate, a self-sustaining, transparent, moistureproof, flexible sheet is produced, suitable for wrapping purposes and other uses. Such self-sustaining sheets contain, in general, less wax than those compositions particularly designed for coating purposes, the wax content being preferably maintained at 2% or less, the respective ingredients remaining the same, however.

For the purposes of this specification and claims, we define moistureproof materials as those which, in the form of continuous, unbroken sheets or films, permit the passage of not more than 690 grams of water vapor per 100 square meters per hour, over a period of 24 hours, at approximately 39.5° C. plus or minus 0.5° C., the relative humidity of the atmosphere at one side of the film being maintained at least at 98% and the relative humidity of the atmosphere at the other side being maintained at such a value as to give a humidity differential of at least 95%.

Moistureproofing coating compositions are defined as those which, when laid down in the form of a thin, continuous, unbroken film applied uniformly as a coating with a total coating thickness not exceeding 0.0005" to both sides of a sheet of regenerated cellulose of thickness approximately 0.0009", will produce a coated product which is moistureproof.

For the purpose of experimental tests, especially for those materials adaptable as coating compositions, moisture-proof materials include those substances, compounds or compositions which, when laid down in the form of a continuous, unbroken film applied uniformly as a coating with a total coating thickness not exceeding 0.0005" to both sides of a sheet of regenerated cellulose of thickness approximately 0.0009", will produce a coated sheet which will permit the passage therethrough of not more than 690 grams of water vapor per 100 square meters per hour over a period of approximately 24 hours, at a temperature of 39.5° C. plus or minus 0.5° C. (preferably 39.5° C. plus or minus 0.5° C.), with a water vapor pressure differential of 50-55 mm. (preferably 53.4 plus or minus 0.7 mm.) of mercury. For convenience, the number of grams of water vapor passed under these conditions may be referred to as "the permeability value." An uncoated sheet of regenerated cellulose having a thickness of approximately 0.0009" will show a permeability value of the order of 6900.

In order to more clearly set forth the practice in accordance with this invention and to explain the nature of the composition contemplated thereby, several specific, illustrative examples are hereinafter set forth, it being understood that these examples illustrate several embodiments which have given satisfactory results and are not intended to restrict the invention thereto.

*Example I*

Parts by weight
Thermoplastic resin-like rubber derivative of the Plioform type_____ 36
Paraffin wax (60-61° melting point)_____ 4

The above substances are dissolved in toluene to give a solution containing 5-30% solids. When coated onto glycol cellulose sheeting and dried at 85-95° C., a transparent, moistureproof sheet is obtained. The coating, however, is very slightly brittle if the coated sheet is to be used for such purposes where it encounters severe flexing. The coating thickness should be approximately 0.00010" and the average permeability value is 50 or less.

*Example II*

The composition shown under Example I is applied to regenerated cellulose sheeting. After the excess coating composition is removed by scraping rods, the sheets are dried at 90° C. The resulting coated sheet is transparent, fairly flexible, non-tacky and is moistureproof.

*Example III*

Parts by weight
Paraffin wax (60-61° melting point)_____ 9
Thermoplastic, resin-like rubber derivative of the Plioform type_____ 1

The above solids are dissolved in high flash naphtha, that is, naphtha having a flash point of not less than 38.5° C., to give a solution containing 5-30% solids. The coating is applied to a base sheet of regenerated cellulose and dried at 90-100° C. The coated sheets are flexible and clear. When rubbed with the fingers, the coating may smear to a very slight extent. The permeability value is 50 or less.

*Example IV*

Parts by weight
Thermoplastic, resin-like rubber derivative of the Plioform type_____ 30
Soft cumar resin_____ 12
Paraffin wax (60-61° melting point)_____ 2-4

The above solids are dissolved in toluene to the extent of 10-40% total solids and are coated onto a base sheet of regenerated cellulose. Drying is carried out at 85-95° C. The resulting sheets are flexible and show a permeability value of 10 or less. Coatings with a higher wax content are likely to show a very slight blush or haze upon standing for several days. Those with a lower wax content do not show this blush. The correct wax content must be adjusted to the particular drying conditions used and to the individual cumar resin going into the compositions.

*Example V*

Parts by weight
Thermoplastic, resin-like rubber derivative of the Plioform type_____ 37.5
Ester gum_____ 9.0
Dixylyl ethane_____ 6.0
Spermaceti wax_____ 2.0
Paraffin wax (60-61° melting point)_____ 4.0

These solids are dissolved in toluene to give approximately 10-30% in the coating composition. The coating composition is applied as described under Example I.

*Example VI*

Parts by weight
Thermoplastic, resin-like rubber derivative of the Plioform type_____ 30
Butyl stearate_____ 4.5
Paraffin wax (60-61° melting point)_____ 0.6-2.0

The above ingredients are dissolved in toluene to the extent of 10-30% solids content. When applied to glycol cellulose, cellulose acetate or to regenerated cellulose sheeting and dried as described under Example I, a clear, flexible, non-tacky sheet is obtained. The coated sheet shows a good slip. The permeability values range from 150 to 4, dependent upon the wax content employed.

*Example VII*

Grams
Thermoplastic, resin-like rubber derivative of the Plioform type_____ 15
Butyl stearate_____ 2.2
Paraffin wax (60-62° melting point)_____ 0.2

The above solids are dissolved in 35 grams of toluene and the resulting solution is suitable for use in casting a self-sustained sheet or film.

A sheet or film may be cast from the above solution onto a nickel plated plate. The temperature of the plate is gradually allowed to rise to 70-85° C., with hot air circulating over the surface thereof. The coated plate is then allowed to cool to 20-35° C. and the film stripped therefrom. The film is clear, flexible and has fair slip. Such a sheet, when made in a thickness of about 0.002" will have a permeability value of 75 or less.

A moistureproofed, transparent, flexible sheeting can be prepared in accordance with the above described invention at a much lower cost than one with the well known pyroxylin coating, due to the fact that the solvents employed are hydrocarbon solvents which are considerably less expensive than the esters and higher alcohols necessary in pyroxylin compositions.

A further advantage of this invention consists in that the herein described composition may be applied to cellulose ester-base sheets, such as, for example, nitrocellulose or cellulose acetate sheets or films without softening or dissolving the same, whereas the ester solvents such as those used in connection with pyroxylin coatings will either soften or dissolve such base sheets.

A moistureproofed, transparent, flexible sheeting produced in accordance with this invention exhibits very desirable heat sealing characteristics, that is to say, when two sheets are placed with their surfaces in contact with each other, a firm joint or seal may be secured by the simple application of heat and pressure without necessitating the use of a separate adhesive.

Obviously, various changes and modifications may be made in the above detailed description without departing from the nature and spirit thereof. It is therefore to be understood that the invention is not to be limited to the specific modifications except as set forth in the appended claims.

I claim:

1. A thin flexible sheet material coated with a composition containing a major proportion of a rubber isomer (pliolite) and a minor proportion of chlorinated diphenyl, said coated sheet being water and moistureproof.

2. A process for producing a moistureproof and heat sealable sheet material which comprises coating a flexible sheet with an organic solvent solution of a chlorinated diphenyl and a rubber isomer (pliolite), and evaporating said solvent from the coating.

3. A thin, flexible sheet material comprising a film of a composition containing a major proportion of a rubber isomer (pliolite) and a minor proportion of chlorinated diphenyl, said sheet material being water and moistureproof.

4. A process for producing a moistureproof and heat sealable sheet material, which comprises casting a flexible film of an organic solvent solution of a chlorinated diphenyl and a rubber isomer (pliolite), and evaporating said solvent from the film.

5. A moistureproof pellicle of glass-clear transparency comprising a thin, flexible sheet material coated with a composition containing a minor proportion of wax, chlorinated diphenyl, a plasticizer, and a major proportion of a thermoplastic, resin-like rubber derivative of the "Plioform" type.

6. The method for producing a transparent, moistureproof and heat sealable sheet material suitable for use as a wrapping tissue, which comprises coating a transparent regenerated cellulosic base sheet precipitated from an aqueous cellulosic dispersion, said sheet being from the group consisting of cellulosic and cellulose ethers with a composition containing a minor proportion of wax material, chlorinated diphenyl, plasticizer and a major proportion of film-forming component, said film-forming component consisting essentially of a thermoplastic, resin-like rubber derivative of the "Plioform" type, and drying said coating at a temperature above the crystallization point of the wax material in the composition.

7. A moistureproof pellicle of glass-clear transparency comprising a thin flexible sheet of lowly substituted methyl cellulose coated with a composition containing a minor proportion of wax, chlorinated diphenyl, a plasticizer, and a major proportion of a thermoplastic, resin-like rubber derivative of the "Plioform" type.

8. A moistureproof pellicle of glass-clear transparency comprising a thin flexible sheet of regenerated cellulose coated with a composition containing a minor proportion of wax, chlorinated diphenyl, a plasticizer, and a major proportion of a thermoplastic, resin-like rubber derivative of the "Plioform" type.

THERON G. FINZEL.

CERTIFICATE OF CORRECTION.

Patent No. 2,209,965.　　　　　　　　　　　　　August 6, 1940.

THERON G. FINZEL.

It is hereby certified that error appears in the printed specification of the above numbered patent requiring correction as follows: Page 3, first column, line 29, for "0.5° C." read --0.25° C.--; and that the said Letters Patent should be read with this correction therein that the same may conform to the record of the case in the Patent Office.

Signed and sealed this 24th day of September, A. D. 1940.

(Seal)　　　　　　　　　　　　　　　　　　　　Henry Van Arsdale,
　　　　　　　　　　　　　　　　　　　　Acting Commissioner of Patents.